(No Model.) 2 Sheets—Sheet 1.
R. O. STUTSMAN.
CORN POPPER.
No. 564,230. Patented July 21, 1896.
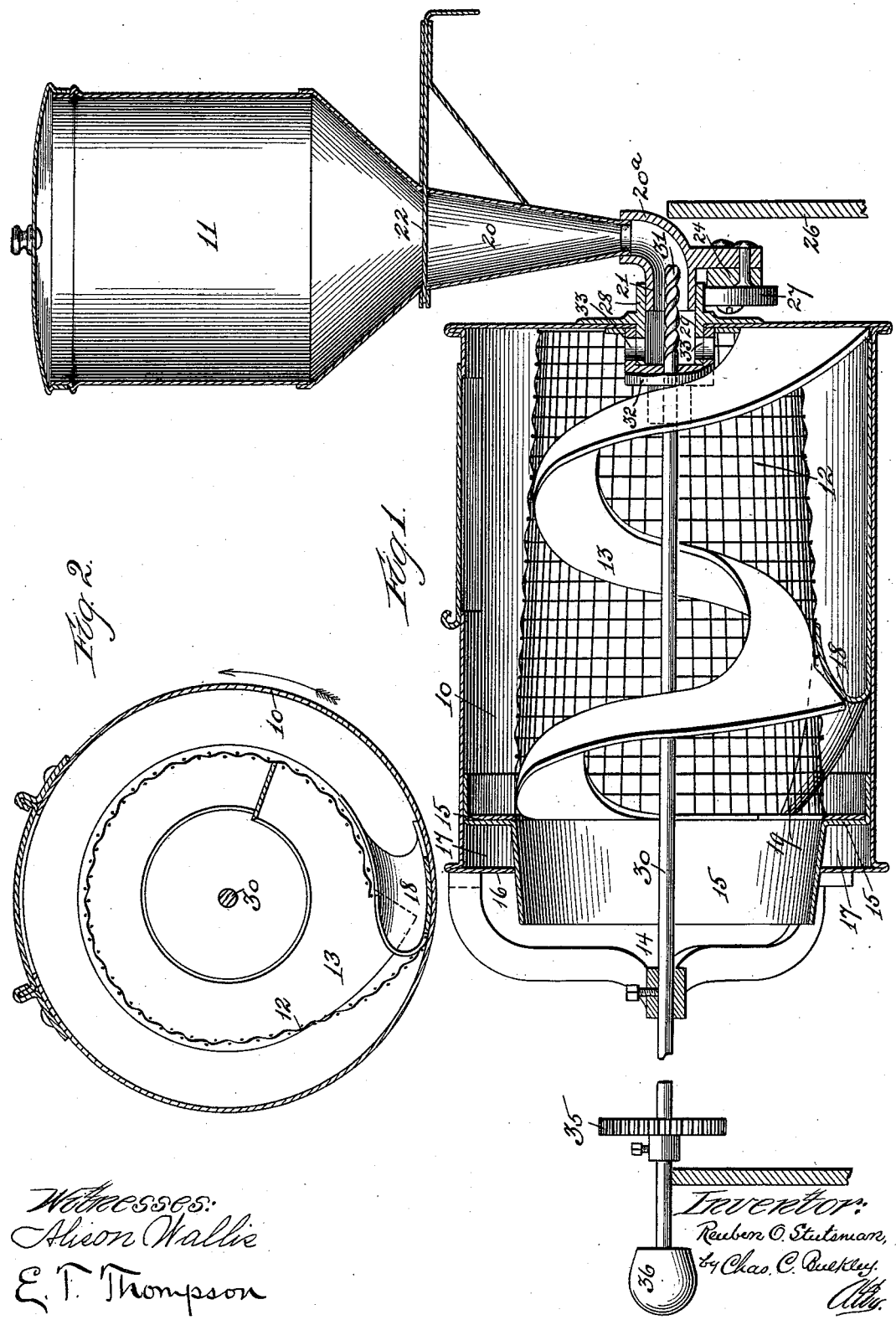
Witnesses:
Alison Wallie
E. T. Thompson
Inventor:
Reuben O. Stutsman,
by Chas. C. Buckley.
Atty.

(No Model.) 2 Sheets—Sheet 2.
R. O. STUTSMAN.
CORN POPPER.
No. 564,230. Patented July 21, 1896.
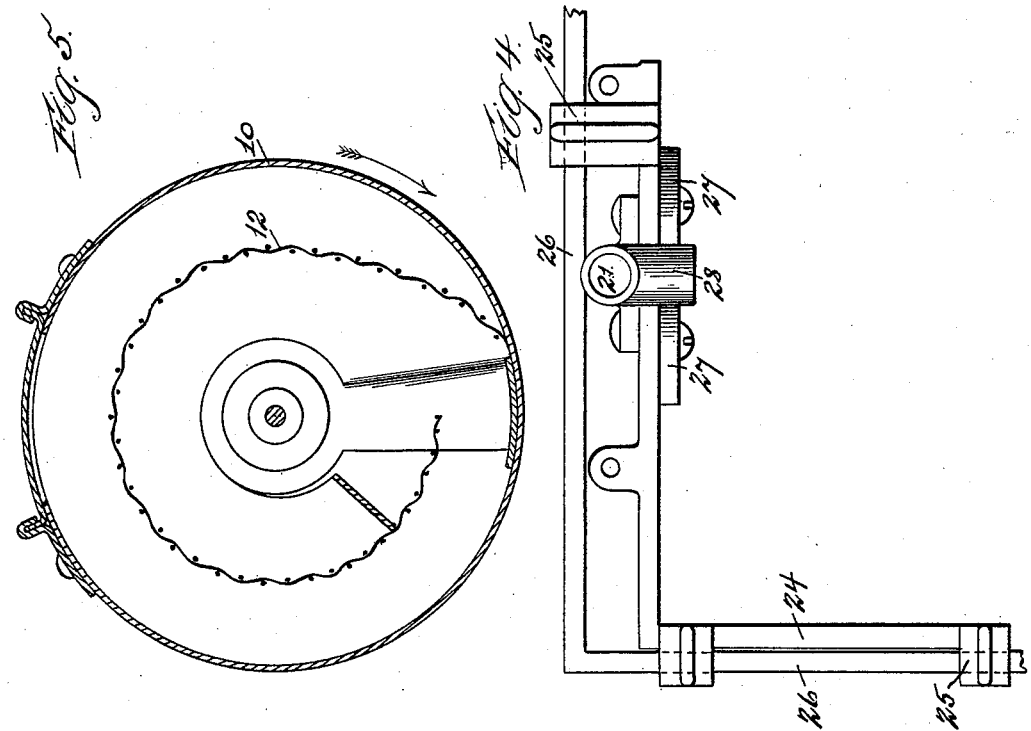
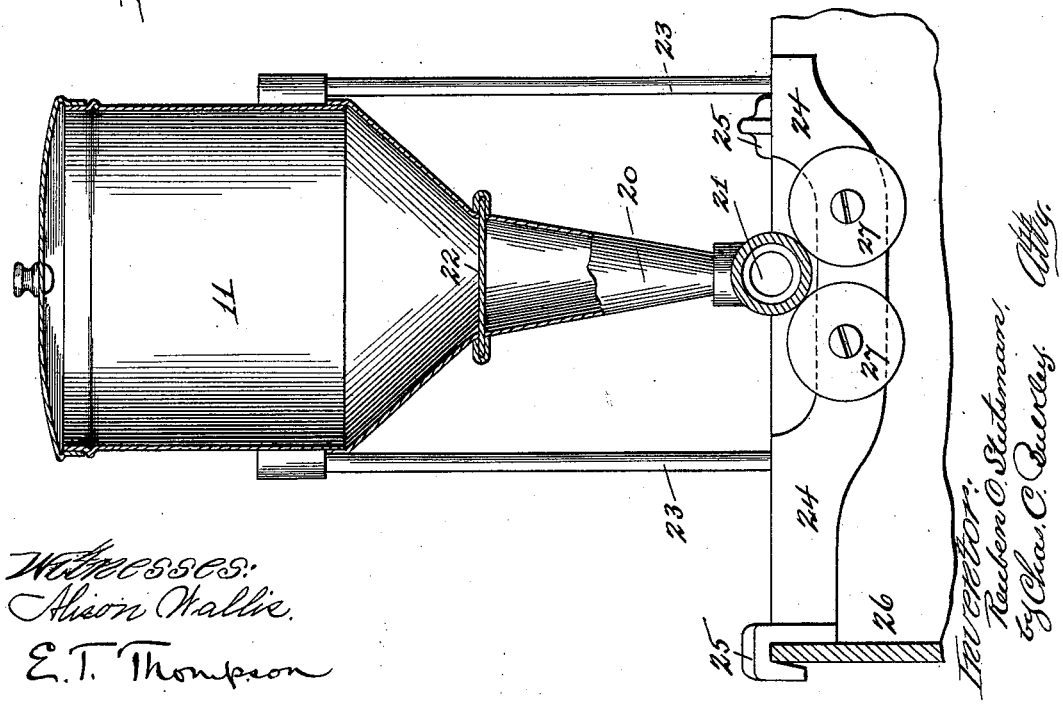
Witnesses:
Alison Wallis.
E. T. Thompson
Inventor:
Robert O. Stutsman,
By Chas. C. Buckley, Atty.

UNITED STATES PATENT OFFICE.

REUBEN O. STUTSMAN, OF DES MOINES, IOWA, ASSIGNOR TO THE BARTHOLOMEW COMPANY, OF SAME PLACE.

CORN-POPPER.

SPECIFICATION forming part of Letters Patent No. 564,230, dated July 21, 1896.

Application filed December 8, 1893. Serial No. 493,126. (No model.)

*To all whom it may concern:*

Be it known that I, REUBEN O. STUTSMAN, a citizen of the United States, residing at Des Moines, in the county of Polk and State of Iowa, have invented certain new and useful Improvements in Corn-Popping Machines, of which the following is a specification, reference being had therein to the accompanying drawings.

My invention relates to improvements in corn-poppers of that class which comprise an external imperforate sheet-metal shell or cylinder and an interior foraminous or sieve-like convolute for separating the popped corn from the unpopped corn.

The main object of the improvements is to provide means for regularly feeding unpopped corn from a suitable supply-receptacle to the popping-cylinder and for regularly and continuously discharging popped corn from said cylinder.

Another object is to provide an article or apparatus which can be readily and quickly applied to a supporting-frame, such as are commonly used in connection with peanut-roasters, after the roasting-cylinder has been removed.

With these ends in view my invention consists in certain details of construction and arrangement of parts hereinafter to be particularly described, and pointed out in my claims, reference being now had to the accompanying drawings, in which—

Figure 1 is a view showing the popping-cylinder and supply-tube thereof in section, and the conveyer for moving the popped corn in elevation. Fig. 2 is a cross-sectional view on the line *x x* of Fig. 1. Fig. 3 is a detail view showing the supporting-bracket attached in position and also showing the containing-hopper in section. Fig. 4 is a plan view showing the attachment of the supporting-bracket in position. Fig. 5 is a cross-sectional view on the line *y y* of Fig. 1.

The popping-chamber is designated at 10 and the corn-containing hopper at 11, the latter being maintained, preferably, in a vertical position, while the former is maintained in a horizontal position.

Referring now to Fig. 1, I provide a screen 12, which is so arranged as to form a convolute apron or platform upon which the corn, when popped, is supported or held, and through the meshes of which the unpopped corn falls and is thereby brought in contact with the cylindrical wall of the imperforate popping-chamber 10, to the exterior of which wall heat is applied in any suitable manner.

Within the screen 12 is disposed a spiral conveyer 13, which extends from one end of the interior to a point near to the other end, at which is the discharge-opening 14.

The screen 12 is secured along one of its edges to the cylindrical wall of the popping-chamber 10, the other edge being elevated above said wall, so that the popped corn after being popped rides upon the screen and is supported thereby. The spiral conveyer then acts upon the popped corn on the screen to move the same toward and out of the discharge-opening 14.

An annular flange 15 is provided, secured to the wall of the popping-chamber 10 near the discharge-opening 14, and to this flange 15 the screen is attached at that portion thereof near the discharge-opening 14. This annular flange 15 extends beyond the discharge-opening 14, and, being slightly conically inclined, tends to cause any unpopped corn which may escape to return into the interior of the popping-chamber 10.

The flange 15, together with the annular rim 16 at the end of the popping-chamber 10, forms a warm-air chamber 17, which tends to conserve and maintain the heat within said popping-chamber 10.

In order to prevent the escape of any unpopped corn from the interior of the popping-chamber 10, and also to deflect the same toward the central portion of said chamber, a deflecting-plate 18 is provided, having a shank 19, by which said plate is secured to the wall of the popping-chamber on the interior thereof, the spiral conveyer being also at this point so formed as to act conjunctively with the deflector.

The corn-containing hopper 11 has a discharge-spout 20, which telescopes into an elbow 20ª, which elbow is secured to bracket-support 24 and serves to support the hopper 11. This elbow 20ª has a discharge-opening 21 at its lower end, a valve 22 being employed to cut off the egress of the corn from the hopper 11. This hopper is held in a vertical position by means of the stay-rods 23, which are secured at their lower ends to the bracket-supports 24 and at their upper ends to the upper sides of the hopper. The bracket-support 24 is provided with the cleats 25, which are adapted to hook the bracket-supports to the sides 26 of, for instance, a peanut-roaster.

Pivotally mounted upon the bracket-supports 24 are the antifriction-wheels 27, upon which the hub 28 of the popping-chamber 10 rests and rides. This hub 28 is perforated to form the entrance-opening for the passage of the corn and telescopes with elbow 20$^a$, so that the discharge-opening 21 delivers the corn within the perforated hub 28.

A rod 30 passes through the axis of the popping-chamber 10, also through the entrance-opening 29, the portion of said rod 30 within the entrance-opening and which extends beyond the same being spirally formed to provide the auger-agitator 31. Within the chamber 10 and mounted on the rod 30 is the seat 32 of what may be termed an "intermittent feed-valve," having the ports 33 opening directly into the interior of the popping-chamber 10, the unpopped corn which passes out of the discharge-opening 21 into the entrance-opening 29 being intermittently fed whenever the port 33 in the seat 32 is in its lowermost position, the agitator 31, which extends into the discharge-opening 21, serving to keep the corn in such a condition of agitation as to prevent packing and maintain a constant feed. The rod 30 also serves as an axial shaft, having mounted thereon the drive-pulley 35 and also a handle-piece at its extreme end.

Having thus described my invention, what I claim as new therein, and desire to secure by Letters Patent, is—

1. In a corn-popper, the combination with the popping-cylinder, of means for continuously withdrawing the popped corn, a supply-duct having a feed-orifice on the axial lines of the cylinder, and a rotary feed-screw arranged longitudinally of the cylinder within the said feed-orifice, substantially as set forth.

2. In a corn-popper, the combination of the popping-cylinder, means for continuously withdrawing the popped corn, means for supplying corn to said cylinder, the axially-arranged shaft for imparting rotary motion to the cylinder, and the feed-screw on said shaft and situated within the supply-orifice of the feed devices, substantially as set forth.

3. In a corn-popper, the combination of the popping-cylinder, means for continuously withdrawing the popped corn, a stationary supply-duct communicating with the interior of the popping-cylinder, and a rotary valve arranged within the popping-cylinder and adapted to intermittingly open and close the discharge-opening of said supply-duct, substantially as set forth.

4. In a corn-popper, the combination of the popping-cylinder, means for continuously withdrawing the popped corn from such cylinder, a stationary supply-duct communicating with the interior of the popping-cylinder, a feed-screw arranged within said supply-duct, and an apertured cap fitted over the discharge end of the supply-duct and rotating with the popping-cylinder, whereby the discharge-opening in said duct is intermittingly opened and closed, substantially as set forth.

5. In a corn-popper, the combination of a popping-cylinder having a tubular axially-arranged support at one end, means for continuously withdrawing popped corn from said cylinder, a stationary supply-duct having one end extending into the tubular support of the popping-cylinder, a rotary shaft arranged at the axis of the cylinder and having a feed-screw formed thereon and extending into the supply-duct, and a cap carried by said shaft and adapted to intermittingly open and close the discharge-opening in the supply-duct, substantially as set forth.

6. In a corn-popper, the combination with a popping-cylinder, of a bracket, 24, having lugs, 25, adapted to take over a supporting-frame, a hopper or receptacle for unpopped corn mounted on said bracket and having a duct communicating with the popping-cylinder, and means within such cylinder for intermittingly opening and closing the discharge-opening in said duct, substantially as set forth.

7. In a corn-popper, the combination of a popping-cylinder having a tubular axial support at one end, means for continuously withdrawing popped corn from the cylinder, a bracket adapted to be supported on a suitable frame, antifriction-rollers mounted on said bracket and supporting the tubular support of the popping-cylinder, a hopper or receptacle for unpopped corn mounted on the bracket and having a supply-duct extending into the tubular support of the cylinder, and means within the popping-cylinder for intermittingly opening and closing the discharge-opening for said duct, substantially as set forth.

8. In a corn-popper, the combination of a relatively stationary supply-hopper, a revoluble popping-cylinder, means for positively advancing corn from said hopper to the interior of the cylinder, a foraminous convolute, for separating the popped corn from the unpopped corn, connected to and revolving with the popping-cylinder, and a conveyer connected to and revolving with the convolute for moving the popped corn longitudinally of the popping-cylinder, substantially as set forth.

9. In a corn-popper, the combination of a relatively stationary supply-hopper, a revoluble imperforate sheet-metal popping-cylinder, means for positively advancing corn from said hopper to the interior of the cylinder, a sieve-like convolute arranged within and connected to the popping-cylinder to rotate therewith and separate the popped corn from the unpopped corn, and a spiral conveyer arranged within and connected to the said convolute to move the popped corn longitudinally thereof, substantially as set forth.

10. In a corn-popper, the combination of an external imperforate sheet-metal cylinder, an annular flanged plate, 15, having one of its flanges extending parallel to and secured to the cylindrical wall of the cylinder and its other flange bent into the form of a truncated cone and extending through one end of, and forming the discharge-passage for, the popping-cylinder, whereby a chamber, 17, is formed in the end of the cylinder adjacent to the discharge-opening, and means arranged within the cylinder for separating the popped corn from the unpopped corn and for advancing the popped corn longitudinally of the cylinder to the discharge-opening, substantially as set forth.

11. In a corn-popper, the combination with a hopper and a popping-cylinder, of means for positively advancing corn from the hopper toward the cylinder, and intermittingly-acting automatic rotary measuring and cutting-off devices arranged between the hopper and the popping-cylinder, substantially as set forth.

12. In a corn-popper, the combination with a hopper, and a revoluble popping-cylinder communicating with the hopper, of rotary measuring devices actuated from and arranged at the inlet end of the cylinder, and means for positively advancing corn from the hopper to such measuring devices, substantially as set forth.

In testimony whereof I affix my signature in presence of two witnesses.

REUBEN O. STUTSMAN.

Witnesses:
ROSE A. COCHRAN,
C. C. BULKLEY.